(No Model.) 2 Sheets—Sheet 1.

J. K. P. TIMMONS.
HORSE DETACHER.

No. 388,931. Patented Sept. 4, 1888.

Witnesses,
Joseph A. Ryan.
C. E. Doyle.

Inventor,
James K. P. Timmons.
By his Attorneys

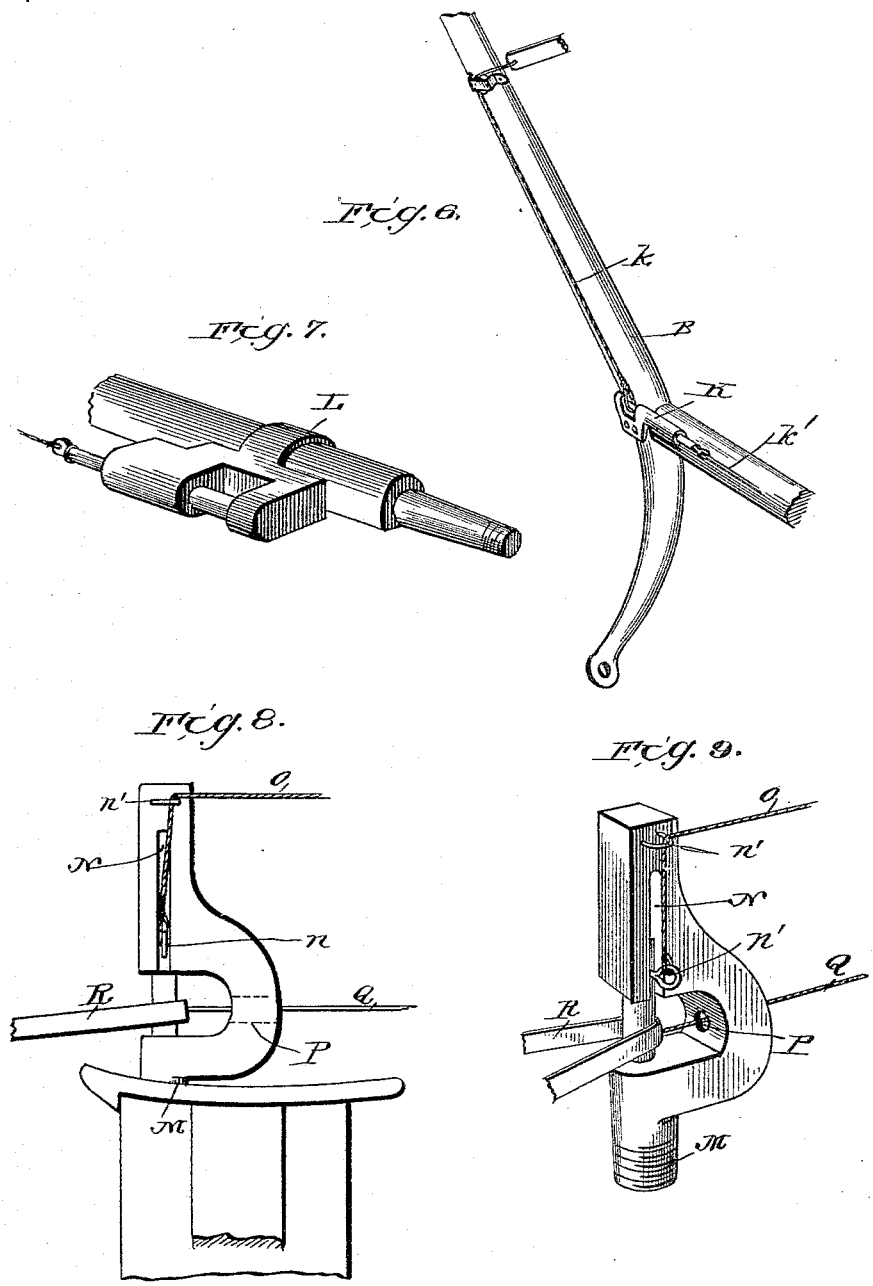

UNITED STATES PATENT OFFICE.

JAMES K. P. TIMMONS, OF TIMMONS, TENNESSEE.

HORSE-DETACHER.

SPECIFICATION forming part of Letters Patent No. 388,931, dated September 4, 1888.

Application filed March 31, 1888. Serial No. 269,063. (No model.)

*To all whom it may concern:*

Be it known that I, JAMES K. P. TIMMONS, a citizen of the United States, residing at Timmons, in the county of Maury and State of Tennessee, have invented new and useful Improvements in Horse-Detachers, of which the following is a specification.

The invention relates to improvements in horse-detachers; and it has for its objects to provide means whereby the traces and the ends of the breech-straps may be simultaneously detached from the vehicle.

The invention consists in a certain novel construction and combination of devices, fully set forth hereinafter in connection with the accompanying drawings, wherein—

Figure 1:
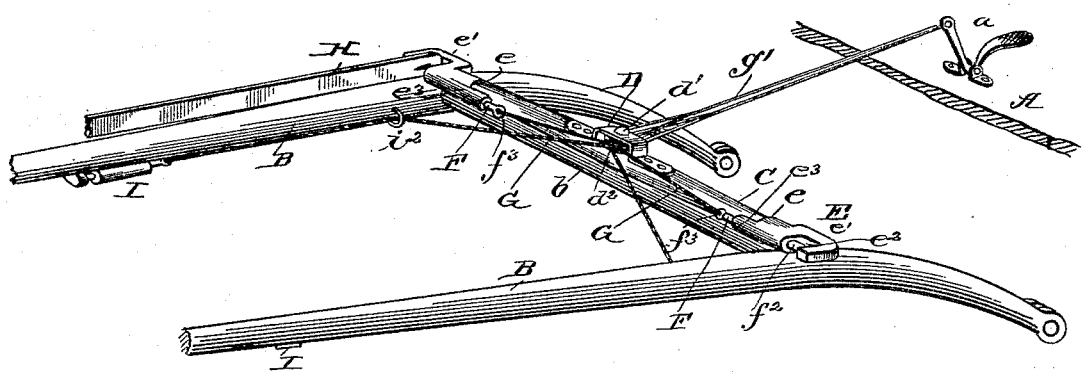
Figure 2:
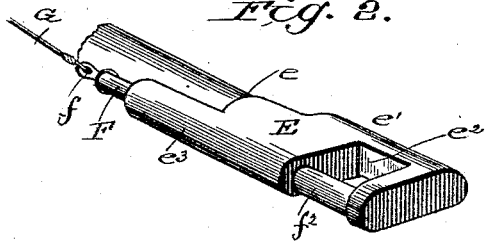
Figure 3:
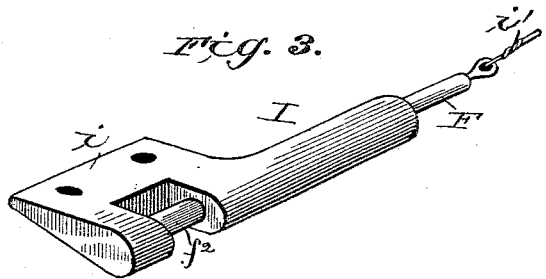
Figure 4:
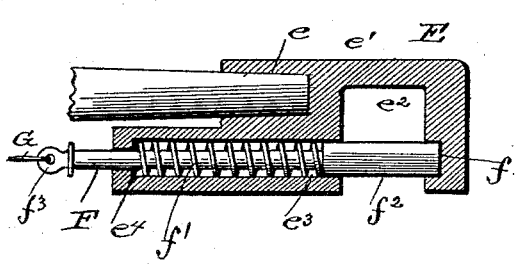
Figure 5:
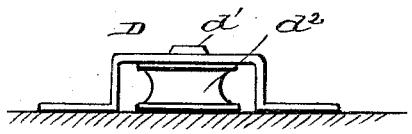

Figure 1 is a perspective view of the front of a vehicle and the thills thereof, with one form of the trace-hook and breech-strap hook attached thereto in the operative positions. Fig. 2 is an enlarged perspective view of the trace-hook detached. Fig. 3 is a similar view of the breech-strap hook. Fig. 4 is a central longitudinal sectional view of the hook to show its interior construction. Fig. 5 is a side view of the roller-bracket and anti-friction roller detached from the vehicle. Fig. 6 is a perspective view of a thill, illustrating a different manner of attaching the breech-strap hook thereto. Fig. 7 is a perspective view of a modification of the hook attached to the end of the axle tree, whereby it may be used as a thill-coupling. Fig. 8 is a side view of a modification of the hook attached to a saddle and used as a checkrein-hook. Fig. 9 is a detail perspective view of the same detached from the saddle.

Referring by letter to the drawings, A designates the front of a vehicle having the treadle *a* attached thereto in a convenient position to be pressed by the foot of the driver, and B B are the thills, which are attached to the front axle-tree by suitable couplings, and the thills are connected at their rear ends by the ordinary thill-bar, *b*.

C represents the whiffletree, pivoted centrally on the thill bar, and D is a rectangular bracket, which is attached to the upper side of the whiffletree by screws which are passed through apertures in the flanges *d* of the bracket. The bracket is provided with a central opening for the passage of the bolt $d'$, that pivots the whiffletree upon the thill-bar, and upon this bolt is journaled the anti-friction roller $d^2$.

Upon the ends of the whiffletree are secured the trace-hooks E, each of which is composed of a socket, *e*, fitting on the end of the whiffletree, a block, $e'$, having a notch, $e^2$, preferably rectangular, in its front side, and a sleeve, $e^3$, to the inner side of the said notch and in front of the socket. The bolt F is mounted in the said sleeve, and it passes at its outer end across the front part of the notch $e^2$ and enters a socket, *f*, in the outer side of the latter when the hook is closed. A spiral spring, $f'$, is arranged in the sleeve $e^3$, which normally holds the bolt pressed outward, with its outer end in engagement with the socket *f*, and when the bolt is drawn inward the said spring is compressed. Both ends of the sleeve $e^3$ are open, and it is provided at a proper point within with a circumferential shoulder, $e^4$, and the bolt is provided with a head, $f^2$, on its outer end, the spring being compressed between the said head and the shoulder $e^4$.

The inner end of the bolt projects beyond the inner end of the sleeve and is provided on its end with an eye, $f^3$, and to this eye is attached the outer end of the cord G. The cord G passes from the bolt around the anti-friction roller $d^2$ and unites with its fellow from the other end of the whiffletree to form the cord *g*, which is attached to the treadle *a*, so that when the treadle is depressed the bolts at both sides of the vehicle are drawn inward, thereby releasing the traces H, through the eyes *h* of which the said bolts pass.

I I are hooks having all the parts of the trace-hooks with the exception of the socket *e*, in lieu of which they are provided with the webs *i*, which are secured to the thills by screws passed through apertures therein. These hooks are attached to the thills with their notches inward and the front ends of the breech-straps are engaged therein. Cords $i'$ pass from the bolts of the said hooks rearward through loops or eyes $i^2$ on the thills, and thence, after passing around the anti-friction roller $d^2$, unite and form a single cord, which is attached to the treadle, whereby when the latter is depressed the breech straps will be released from the thills.

In Fig. 6 is illustrated a different manner of arranging the breech-strap detacher, in which the hook K (similar to the hook I) is attached to the under side of the thill at the intersection of the thill-bar, and a bracket having an anti-friction roller mounted therein is attached to the under side of the thill at a point corresponding to that occupied by the hooks I I in Fig. 1. Cords $k$ are attached to the front ends of the breech-strap, thence pass around the anti-friction rollers, and are provided at their rear ends with loops which are engaged in the hooks K. Cords $k'$ are attached to the bolts of the said hooks K, and after passing around the anti-friction roller, which is located on the upper side of the whiffletree, they are united and pass as a single cord to the treadle, in the same manner as the detaching-cords hereinbefore mentioned. When the bolts in the hooks K are retracted, the cords $k$ are released and they are drawn through the brackets which are attached to the thills, thereby releasing the breech-straps.

In the modification shown in Fig. 7 the device is intended to act as a thill-coupling, by means of which the thills may be immediately uncoupled from the axle. The only difference between this form of the hook and those hereinbefore described lies in the means provided for its attachment to the vehicle, which consist of a sleeve, L, that fits around the axle. The devices for operating the bolt are identical with those hereinbefore described.

In Figs. 8 and 9 is illustrated a modification of the hook which is adapted to serve as a checkrein hook, and it is provided on the end having the block with a threaded stud, M, which is adapted to engage a tapped aperture in the saddle. Instead of having its bolt extend entirely through the sleeve, the side of the sleeve is provided with a longitudinal slot, N, through which projects the eye $n$ on the side of the bolt. A guide eye or loop, $n'$, is attached to the side of the sleeve above the slot, and the cord O, which is attached to the eye $n$, passes through the guide eye or loop $n'$ and extends back to the driver, whereby when the cord is pulled the bolt is raised or retracted.

An aperture, P, is formed in the rear side of the notch of the hook, and a cord, Q, is attached to the bend of the checkrein R and passes through the said aperture. Therefore, to release the checkrein, retract the bolt by means of the cord O, and to return the checkrein to the hook draw the cord Q until the checkrein enters the hook and then release the bolt and allow it to engage the checkrein. Thus the checkrein may be either engaged or disengaged by the driver without leaving the vehicle.

It will be seen from the foregoing description that the hooks used in the various situations are all of the same general construction, differing only in their special adaptation to the parts of the vehicle to which they are attached. The construction of the checkrein-hook differs only insomuch as to enable the horizontal pull upon the cord to be converted into a vertical pull, whereby the bolt may be raised, this being accomplished by simply passing the said cord through a guide eye or loop before attaching it to the bolt.

By the means herein described the traces and breech-straps may be detached from the vehicle, the thills may be detached from the axle, and the checkrein may be detached from the hook simultaneously, thereby entirely freeing the horse.

Having thus described my invention, what I claim, and desire to secure by Letters Patent of the United States, is—

1. In a horse-detacher, the combination of the trace-hooks E E, affixed to the ends of the whiffletree and provided with the notches $e^2$ and the spring-actuated bolts $f^2$, the treadle arranged at a suitable point on the vehicle convenient to the feet of the driver, the anti-friction roller mounted in a suitable bracket at the center of the whiffletree, the cords G G, passing around the said roller and connecting the bolts $f^2$ to the treadle, the hooks I I, provided with spring-actuated bolts adapted to engage the holdback and having ears $i$, adapted to be secured to the thills, and the cords connecting the bolts of the hooks I to the said treadle, whereby when the latter is operated the traces and the holdback are simultaneously released, substantially as and for the purpose specified.

2. In a horse-detacher, the hooks E E, secured to the ends of the whiffletree and provided with spring-actuated bolts to engage the traces, and the hooks I I, secured to the thills and provided with spring-actuated bolts to engage the holdback, in combination with a treadle located at a suitable point in the vehicle and connected by suitable cords or chains with the said bolts, as set forth.

3. The combination, with the hook composed of the block having a notch in its front side provided with an aperture, P, the threaded stud on one end of the block, the sleeve on the opposite side of the block having a longitudinal slot in its side, the bolt mounted in the sleeve and having an eye projecting through the said slot, the spring mounted in the sleeve and operating the bolt, and the guide eye or loop on the side of the sleeve, of the cord attached to the eye on the bolt and passing through the guide eye or loop and extending to the driver, and the cord attached to the rear end of the checkrein and passing through the said aperture P, substantially as and for the purpose specified.

In testimony that I claim the foregoing as my own I have hereto affixed my signature in presence of two witnesses.

JAMES K. P. TIMMONS.

Witnesses:
E. C. HANGREW,
W. H. WILSON.